US006157100A

United States Patent [19]

Mielke

[11] Patent Number: 6,157,100

[45] Date of Patent: Dec. 5, 2000

[54] ELECTROMAGNETIC DRIVE FOR A FOCAL-PLANE SHUTTER

[75] Inventor: Bodo Mielke, Wolfenbuettel, Germany

[73] Assignee: Rollei Fototechnic GmbH, Braunschweig, Germany

[21] Appl. No.: 09/354,720

[22] Filed: Jul. 16, 1999

[30] Foreign Application Priority Data

Jul. 17, 1998 [DE] Germany .......................... 198 32 244

[51] Int. Cl.[7] .......................... H02K 41/00; H02K 33/00; H02K 7/20; G03B 9/08

[52] U.S. Cl. .............................. 310/13; 310/112; 310/15; 310/27; 396/463; 396/467; 396/468; 396/471

[58] Field of Search ................................ 310/12, 13, 14, 310/112, 15, 23, 27, 30, 34; 396/452, 463, 467, 468, 469, 471; 335/148

[56] References Cited

U.S. PATENT DOCUMENTS

| | | | |
|---|---|---|---|
| 3,724,350 | 4/1973 | Mielke | 95/53 E |
| 3,728,654 | 4/1973 | Tada | 335/234 |
| 3,812,501 | 5/1974 | Mielke | 95/64 D |
| 3,883,886 | 5/1975 | Mielke | 354/271 |
| 3,911,459 | 10/1975 | Mielke | 354/273 |
| 3,980,908 | 9/1976 | McClintock | 310/14 |
| 4,051,499 | 9/1977 | Kondo | 354/234 |
| 4,127,835 | 11/1978 | Knutson | 335/266 |
| 4,265,530 | 5/1981 | Petersen | 354/235 |
| 4,363,980 | 12/1982 | Petersen | 310/15 |
| 4,596,453 | 6/1986 | Fujino et al. | 354/234.1 |
| 4,785,816 | 11/1988 | Dow et al. | 128/660.1 |
| 5,231,336 | 7/1993 | Van Namen | 318/128 |
| 5,333,025 | 7/1994 | Dowe | 354/234.1 |
| 5,434,549 | 7/1995 | Hirabayashi et al. | 335/229 |
| 5,548,367 | 8/1996 | Katagiri | 354/234.1 |
| 5,687,417 | 11/1997 | Furlani et al. | 396/449 |
| 6,017,156 | 1/2000 | Depatie et al. | 396/463 |

FOREIGN PATENT DOCUMENTS

| | | |
|---|---|---|
| 20 31 565 | 12/1971 | Germany . |
| 26 16 636 | 10/1976 | Germany . |
| 25 26 420 | 12/1976 | Germany . |

OTHER PUBLICATIONS

Abstract of JP 57 017938, Oba Takehiko, Jan. 29, 1982, Electrcmagnetic Focal Plane Shutter, Patent Abstracts of Japan, vol. 006, No. 082 (P–116)(1982).

*Primary Examiner*—Nestor Ramirez
*Assistant Examiner*—Dang Dinh Le
*Attorney, Agent, or Firm*—Foley & Lardner

[57] ABSTRACT

An electromagnetic drive for a focal-plane shutter of a camera having two light-excluding shutter curtains, each of the two shutter curtains being having its own electric drive motor, which is a linear motor constructed from permanent magnets and electromagnetic coils. The linear motor has at least two mutually aligned permanent magnets. The opposite pole faces of the magnets have the same polarity. A soft-magnetic disk is disposed between the permanent magnets. A soft-iron casing encloses the magnets and the soft-magnetic disk with an annular gap therebetween. A coil former is displaceably mounted in the annular gap such that it can exert an operating stroke between two stops. The coil former has a drive element for transferring the axial displacement of the coil former to the assigned shutter curtain.

15 Claims, 5 Drawing Sheets

ELECTROMAGNETIC DRIVE FOR A FOCAL-PLANE SHUTTER

BACKGROUND OF THE INVENTION

1. Field of the Invention

The invention relates to an electromagnetic drive for a focal-plane shutter of a camera having two light-excluding shutter curtains, each of which has its own linear motor constructed from permanent magnets and electromagnetic coils.

2. Background of the Invention

A drive is described, for example, in DE 26 16 636 C3. However, drive mechanisms which are driven by mechanical prestressing devices, such as springs and the like, are still usually used for achieving the traversing movement of shutter curtains in portable cameras having focal-plane shutters. These known shutter drive mechanisms require a stressing device which, after completion of an exposure, returns the shutter curtains into the starting position and thereby stresses the springs, so that the next exposure can take place. This additional return mechanism complicates the overall shutter system and increases the number of components required, thereby increasing the production and assembly costs. In addition, many of the current motor-operated cameras have a motor-gear unit that operates the stressing device.

These difficulties or problems with known drive mechanisms are not intended to be exhaustive, but are among many tending to reduce the desirability of the known drive mechanisms. Other notable problems may exist; those presented above, however, should be sufficient to demonstrate that devices appearing in the past are amenable to worthwhile improvement.

SUMMARY OF THE INVENTION

Accordingly, it is a general object of the invention to provide a device that obviates or minimizes the problems of known drive mechanisms.

It is a specific object of the invention to provide a drive mechanism having a simple construction.

It is another object of the invention to provide a drive mechanism that has a space-saving assembly.

A preferred embodiment of the invention intended to accomplish at least some of the foregoing objects includes a linear motor which includes a soft-iron casing or pot. First and second mutually aligned permanent magnets are housed in the soft-iron casing, and a magnetic pole of the first magnet and an opposite lying pole of the second magnet have the same polarity. A soft-magnetic disk is disposed between the first and second permanent magnets. An annular gap is provided between outer surfaces of the permanent magnets and the magnetic disk and an inner lateral surface of the soft-iron casing. A coil former including a winding is axially displaceably mounted in the annular gap and exerts an operating stroke between two stops, wherein the coil former extends at least partially over the soft-magnetic disk. A drive element provided on the coil former transfers the axial displacement of the coil former to an assigned shutter curtain.

Additional objects and advantages of the invention will be set forth in the following description of the preferred embodiments and, in part, will be apparent from the description or through practicing the invention.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

DETAILED DESCRIPTION OF PREFERRED EMBODIMENTS

Figure 1:
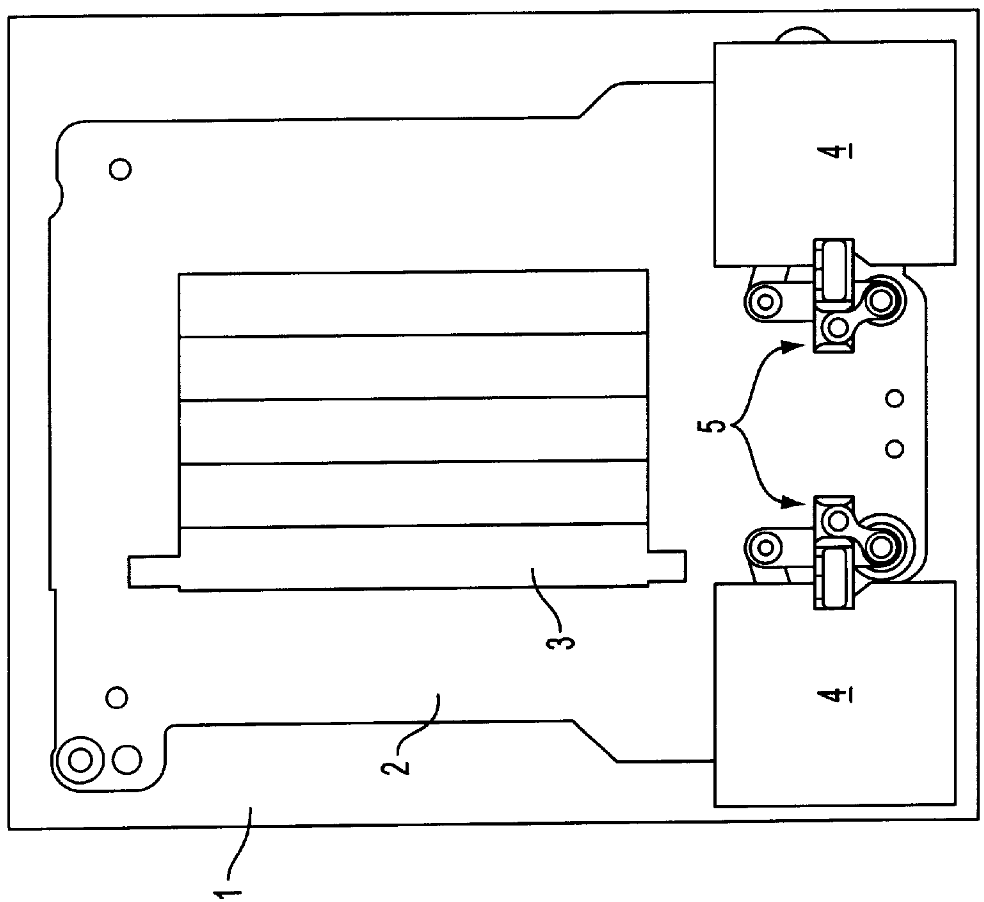
FIG. 1 is a plan view of a focal-plane shutter having an electromagnetic drive formed by two linear motors.

Referring to FIG. 1, there will be seen a focal-plane shutter housing 2, arranged in a camera housing 1, having two light-excluding shutter curtains 3, each of which has its own linear motor 4 as an electromagnetic drive. The drive transfer elements are schematically shown as lever linkages 5.

Figure 2:
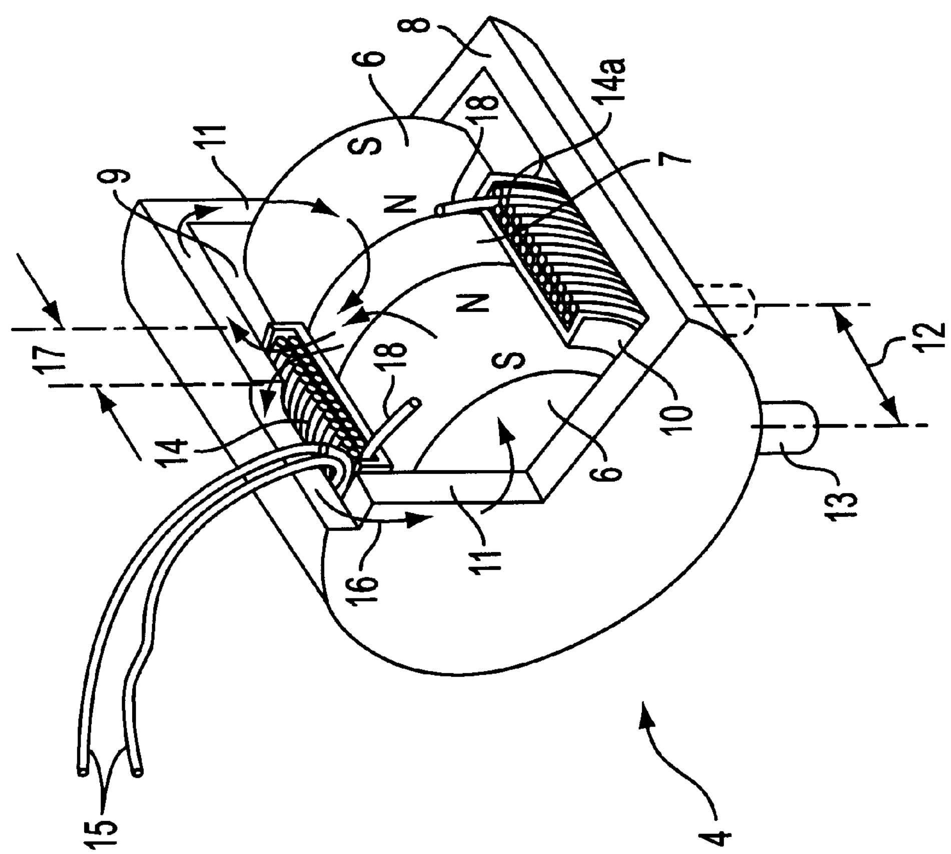
FIG. 2 is a partially sectioned perspective view of a linear motor according to the invention.

FIG. 2 shows the construction of a linear motor 4 in accordance with the invention. The motor 4 has two mutually aligned permanent magnets 6, the opposite pole faces of each having the same polarity. A soft-magnetic disk 7 is enclosed by, and has the same exterior contour as, the two permanent magnets 6. The soft-magnetic disk preferably is a solid soft-iron cylinder constructed from a soft-magnetic material. The permanent magnets 6, which are formed from rare-earth magnets, are bar-shaped and preferably cylindrical in design. The permanent magnets 6 and the soft-magnetic disk 7, which is adhesively bonded to the magnets 6, have the same diameter.

A soft-iron casing or pot 8 encloses the permanent magnets 6 and the soft-magnetic disk 7. There is an annular gap 9 between the inner lateral surface of the soft-iron casing 8 and the outer lateral surface of the permanent magnets 6. A coil former 10 is mounted in annular gap 9 in an axially displaceable manner. The coil former 10 may exert an operating stroke 12 between the end walls, which act as stops 11. A drive element, or drive pin, 13 is provided on the coil former 10 of the casing to transfer the operating stroke 12 to the lever linkage 5 to actuate the shutter curtain 3. The drive element 13 protrudes outward through an adapted slot opening provided in the soft-iron casing 8 (not shown in detail in the drawings).

The coil former 10 encloses a coil winding 14, which has an electrical connection 15. The magnetic flux emanating from the permanent magnets 6 into the soft-magnetic disk 7 and from the soft-magnetic disk 7 into the gap 9 is marked by arrows 16. This results in a highly effective working gap 17 radially outside the soft-magnetic disk 7 over its entire axial length.

The structural design is chosen in such a way that, in each of its positions, the coil former 10 extends over the soft-magnetic disk 7 with the same number of coil windings, so that there is always the same number of coil windings in the working gap 17. To optimize the compact overall length, it is expedient in this case if, in each of the two stop positions of the coil former 10, the last winding **14*a* of the coil, remote from the corresponding stop 11, is also the last coil winding still in the working gap 17**.

The two stops 11 are each assigned a magnetic detent formed by a respective open soft-iron ring 18 placed on the two axial coil ends of winding 14. In this case, it also preferable if, in one stop position of the coil former 10, the soft-iron ring 18 that is remote from the corresponding stop 11 extends beyond the outer boundary of the working gap 17.

Figure 3:
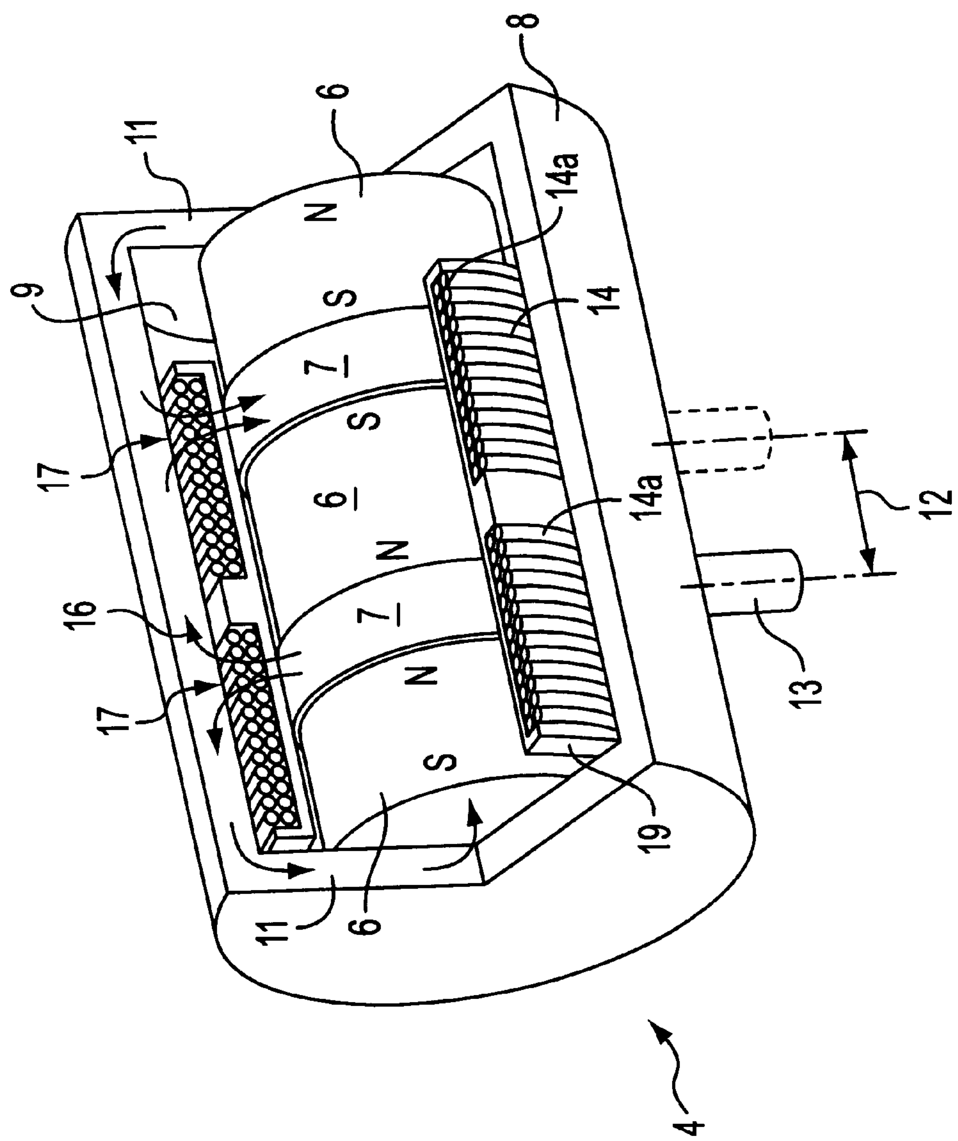
FIG. 3 is a partially sectioned perspective view of a linear motor according to another embodiment of the invention.

FIG. 3 shows a modified embodiment of the linear motor 4. In this embodiment, there are three permanent magnets 6, two soft-magnetic disks 7 interposed between the adjacent magnets 6, and a double coil 19. Consequently, there are two working gaps 17 and, thus, twice the force effect, as well as an approximately 1.4-times faster actuation with respect to the embodiment according to FIG. 2. In this case, the doubling of the force effect is achieved with only one additional permanent magnet and a second soft-magnetic disk, so that there is not twice the overall length in comparison with the embodiment according to FIG. 2.

Figure 4:
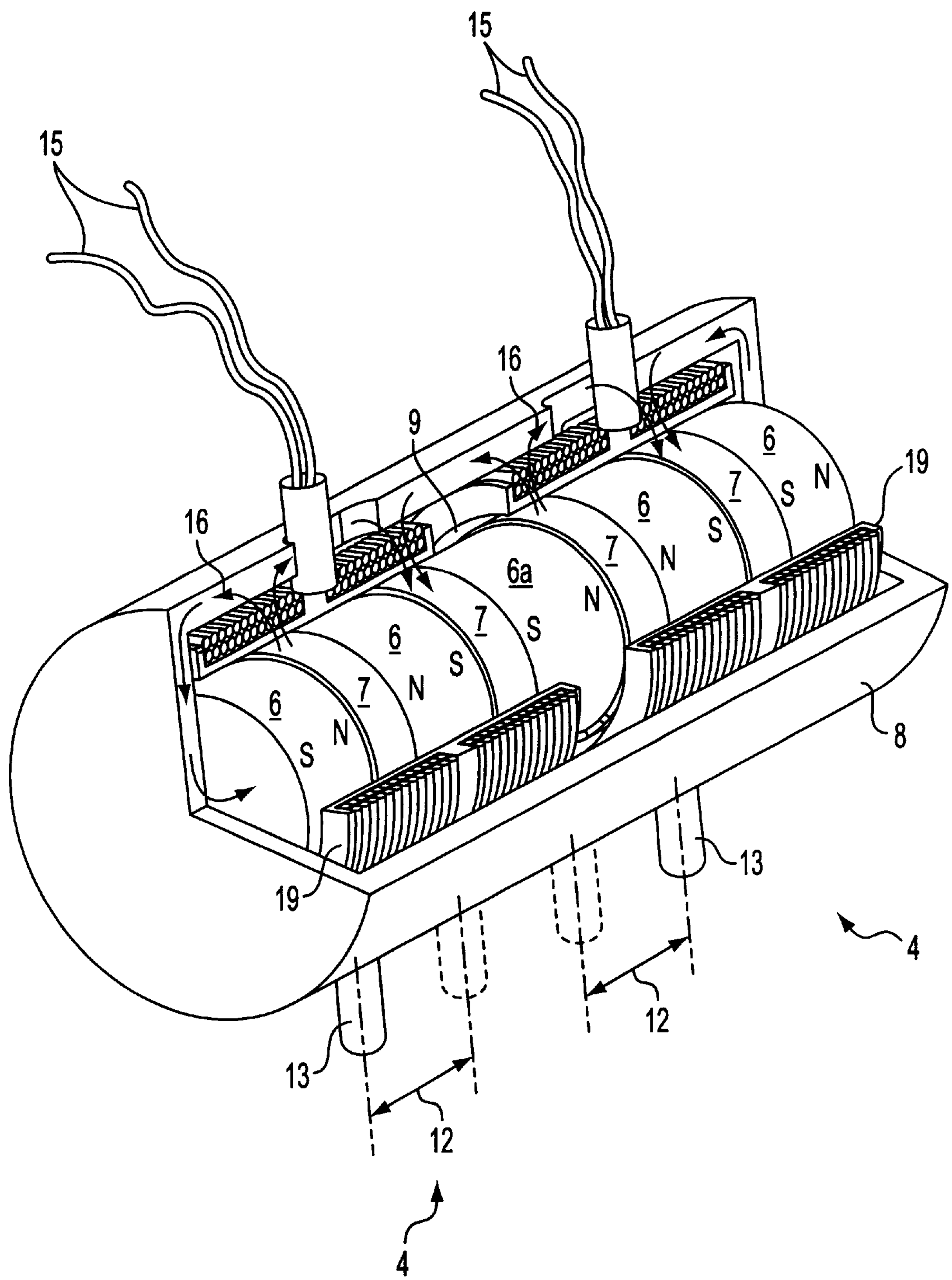
FIG. 4 is a partially sectioned perspective view of a linear motor according to yet another embodiment of the invention.

FIG. 4 shows an embodiment in which the two linear motors 4 required for driving the two shutter curtains are enclosed axially in line with one another by a common soft-iron casing 8. In terms of construction, these are two linear motors according to FIG. 2 with a commonly used middle fifth permanent magnet 6*a* and two additional soft-magnetic disks 7. The force effect and the operating speed of each of the two linear motors 4 correspond approximately to those of the embodiment of FIG. 3, without doubling the overall axial length of the linear motor of FIG. 3.

Figure 6:
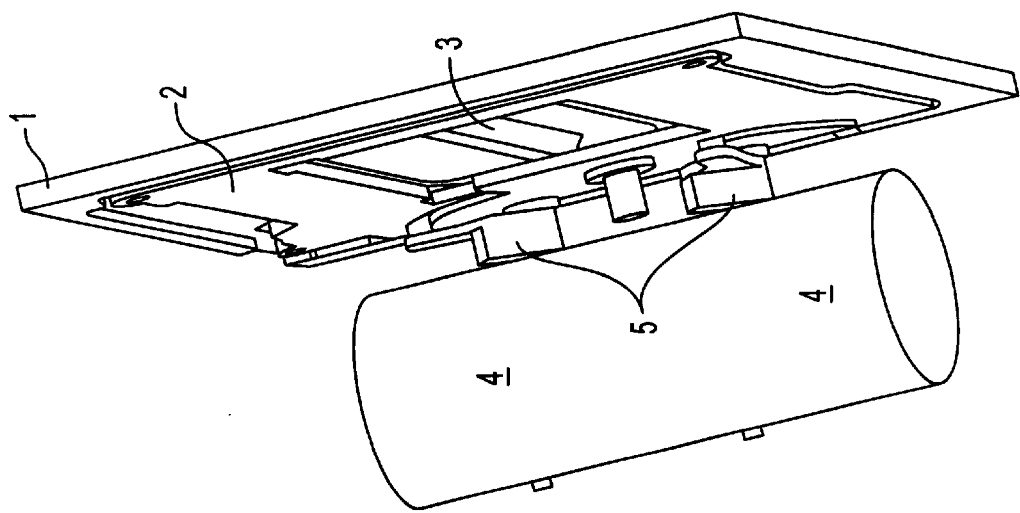
FIG. 6 is an oblique side view of FIG. 5.
Figure 5:
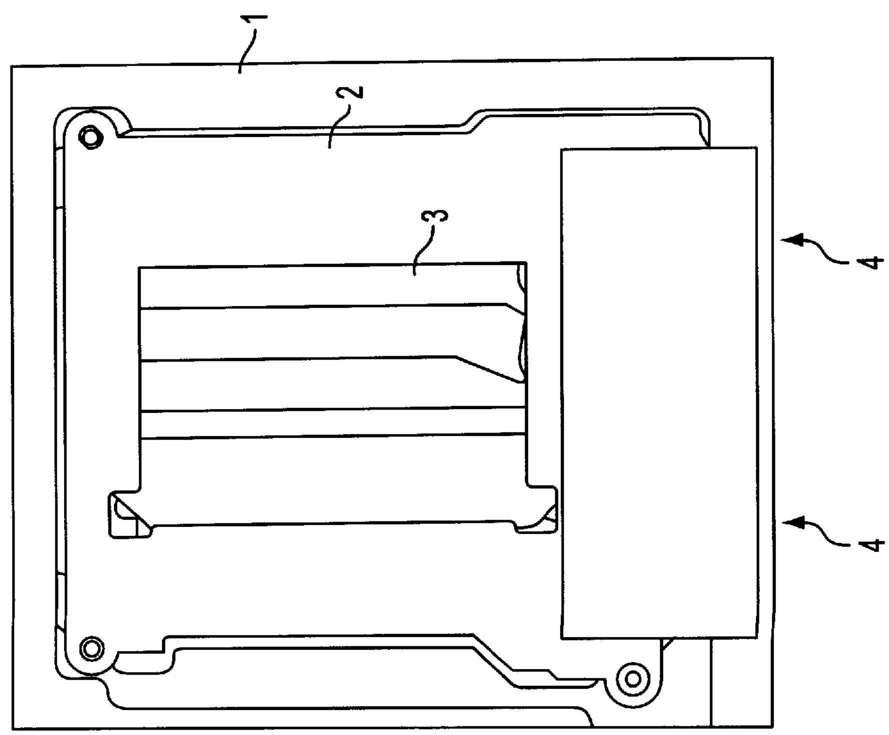
FIG. 5 is a plan view of the embodiment of FIG. 1 with an electromagnetic drive according to FIG. 4.

FIGS. 5 and 6 show the combined drive according to FIG. 4 mounted on the focal-plane shutter housing 2.

According to the invention, utilizing the saturation induction of the soft-magnetic disk 7 achieves an induction that is many times higher than in the permanent magnets 6 themselves. A concentration and compaction of the magnetic lines of force is achieved, so that a highly effective operating air gap is obtained in the annular gap 9 in the region of the soft-magnetic disk 7.

The drive according to the invention is of a very compact form, its inner overall length determined by the axial width of the operating air gap, the operating stroke of the coil and the wall thicknesses of the coil. A compact design is ensured if the permanent magnets 6, the soft-magnetic disk 7 and the soft-iron casing 8 are each cylindrical.

A compact design is also created if the permanent magnets are rare-earth magnets. In this case, it is essential that the reliability and functioning of the remaining parts outside the magnetic unit are not adversely affected by stray magnetic flux, which is achieved by fully enclosing the magnetic system within the soft-iron casing. As a result, assembly of the magnetic system is also made easier, because no strong magnetic forces act on the remaining components.

To reduce the overall axial length of the drive, it is advantageous if the stops 11, which limit the axial displacement of the coil former 10, are each formed by the end wall of the soft-iron casing 8.

To keep the electromagnetic drive unit in its end positions in such a way that no small movements of the shutter curtains, and consequently unintentional film exposure, are caused by even slight vibrations or impact, it is expedient if the two stops 11 are each assigned a magnetic detent. As a result, the shutter curtains are securely held still by a defined retaining force. A magnetic detent of a simple construction is created by placing open soft-iron rings on each of the two axial coil ends in their winding. In the two end positions of the coil, the magnetic forces of attraction act alternately in the region of the working gap. The retaining force of this magnetic detent can be determined by the wire diameter of the rings.

To optimize the compact overall length of the drive, it is expedient if, in each stop position of the coil former, the last winding of the coil, which is remote from the stop, is also the last coil winding still in the working gap radially outside the soft-magnetic disk, while the embedded open soft-iron ring lies just beyond the working gap.

To achieve a higher force effect and a greater operating speed, it is advantageous if the linear motor comprise three permanent magnets, two soft-magnetic disks interposed between the permanent magnets, and a double coil.

To minimize the required installation space for the two linear motors, it is expedient if the two linear motors for the two shutter curtains are enclosed axially in line with one another by a common soft-iron casing. In this case, the overall axial length can be further reduced by the two linear motors together comprising an odd number of permanent magnets, of which the middle permanent magnet is operatively assigned to both linear motors.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

Priority document, DE 198 32 244.5, filed Jul. 17, 1998, is hereby incorporated by reference.

What is claimed is:

1. An electromagnetic drive of a focal-plane shutter of a camera having two light-excluding shutter curtains, each assigned its own linear motor, each linear motor comprising:

a soft-iron casing;

first and second mutually aligned permanent magnets housed in the soft-iron casing, wherein a magnetic pole of the first magnet and an opposite lying pole of the second magnet have the same polarity;

a soft-magnetic disk disposed between the first and second permanent magnets;

an annular gap defined between outer surfaces of the permanent magnets and the magnetic disk and an inner surface of the soft-iron casing;

a coil former, including a coil winding, axially displaceable mounted in the annular gap to exert an operating stroke between two stops, wherein the coil former extends at least partially over the soft-magnetic disk; and a drive element provided on the coil former that transfers the axial displacement of the coil former to an assigned shutter curtain, said drive element protruding outward through an adopted slot opening provided in the soft-iron casing.

2. The drive as claimed in claim 1, wherein the permanent magnets, the soft-magnetic disk, and the soft-iron casing are each cylindrical.

3. The drive as claimed in claim 1, wherein the permanent magnets are rare-earth magnets.

4. The drive as claimed in claim 1, wherein a face of each pole of the permanent magnets is adhesively bonded to the soft-magnetic disk.

5. The drive as claimed in claim 1, wherein each stop is a respective end wall of the soft-iron casing.

6. The drive as claimed in claim 1, wherein each of the two stops has a magnetic detent.

7. The drive as claimed in claim 6, wherein each magnetic detent includes an open soft-iron ring placed on the two axial coil ends of the winding.

8. The drive as claimed in claim 7, wherein a last winding of the coil winding remote from its respective stop is the last coil winding still in a working gap while the open soft-iron ring extends beyond the working gap.

9. The drive as claimed in claim 1, wherein the linear motor further comprises a third permanent magnet, a second soft-magnetic disk disposed between the second and third permanent magnets, and a double coil.

10. The drive as claimed in claim 1, wherein the two linear motors for the two shutter curtains are enclosed axially in line with one another by a common soft-iron casing.

11. The drive as claimed in claim 10, wherein the two linear motors together comprise an odd number of permanent magnets, of which the middle permanent magnet is shared by both linear motors.

12. The drive as claimed in claim 1, wherein the permanent magnets and the soft-iron disk have identical diameters.

13. A linear motor for an electromagnetic drive of a focal-plane shutter of a camera, the linear motor comprising:

a soft-iron casing;

first and second mutually aligned permanent magnets housed in the soft-iron casing, wherein a magnetic pole of the first magnet and an opposite lying pole of the second magnet have the same polarity;

a soft-magnetic disk disposed between the first and second permanent magnets;

an annular gap defined between outer surfaces of the permanent magnets and the magnetic disk and an inner surface of the soft-iron casing;

a coil former, including a coil winding, axially displaceable mounted in the annular gap to exert an operating stroke between two stops, wherein the coil former extends at least partially over the soft-magnetic disk; and a drive element provided on the coil former that transfers the axial displacement of the coil former to an assigned shutter curtain, said drive element protruding outward through an adopted slot opening provided in the soft-iron casing.

14. An electromagnetic drive of a focal-plane shutter of a camera having two light-excluding shutter curtains, each assigned its own linear motor, each linear motor comprising:

a soft-iron casing;

first and second mutually aligned permanent magnets housed in the soft-iron casing, wherein a magnetic pole of the first magnet and an opposite lying pole of the second magnet have the same polarity;

a soft-magnetic disk disposed between the first and second permanent magnets;

an annular gap defined between outer surfaces of the permanent magnets and the magnetic disk and an inner surface of the soft-iron casing;

a coil former, including a coil winding, axially displaceable mounted in the annular gap to exert an operating stroke between two stops, wherein the coil former extends at least partially over the soft-magnetic disk; and a drive element provided on the coil former that transfers the axial displacement of the coil former to an assigned shutter curtain, wherein the two linear motors for the two shutter curtains are enclosed axially in line with one another by a common soft-iron casing.

15. The drive according to claim 14, wherein the two linear motors together comprise an odd number of permanent magnets, of which a middle magnet is shared by both linear motors.

* * * * *